United States Patent [19]

Odawara et al.

[11] 4,108,818

[45] Aug. 22, 1978

[54] PROCESS FOR THE MELT-SHAPING OF ACRYLONITRILE POLYMERS

[75] Inventors: Kenji Odawara; Shoichi Takeuchi, both of Okayama, Japan

[73] Assignee: Japan Exlan Company Limited

[21] Appl. No.: 663,281

[22] Filed: Mar. 2, 1976

[30] Foreign Application Priority Data

Mar. 3, 1975 [JP] Japan .................................. 50-26283

[51] Int. Cl.² ...................... C08L 33/20; C08L 51/00
[52] U.S. Cl. .................. 260/29.6 AQ; 260/29.6 AN; 260/32.4; 260/881; 264/182; 264/211; 264/331
[58] Field of Search ...... 260/881, 29.6 AN, 29.6 AQ, 260/32.4; 264/182, 331, 211

[56] References Cited

U.S. PATENT DOCUMENTS

| | | |
|---|---|---|
| 2,657,191 | 10/1953 | Coover et al. ................... 260/881 X |
| 2,883,360 | 4/1959 | Coover et al. ............... 260/29.6 AN |
| 3,078,243 | 2/1963 | Bibolet et al. ............... 260/29.6 AQ |
| 3,351,602 | 11/1967 | Dunnavant et al. ............. 260/881 X |
| 3,412,177 | 11/1968 | Griffith ................................ 260/881 |
| 3,634,575 | 1/1972 | Serad ................................ 264/182 X |
| 3,655,857 | 4/1972 | Bohrer et al. ............ 260/29.6 AQ X |
| 3,793,277 | 2/1974 | Thompson .................. 260/29.6 AN |
| 3,873,508 | 3/1975 | Turner ..................... 260/29.6 AN X |
| 3,896,204 | 7/1975 | Goodman et al. ...... 260/29.6 AN X |
| 3,928,496 | 12/1975 | Takeda et al. .................. 260/881 X |

Primary Examiner—Wilbert J. Briggs, Sr.
Attorney, Agent, or Firm—Wenderoth, Lind & Ponack

[57] ABSTRACT

An acrylonitrile polymer composition obtained by uniformly mixing an acrylonitrile polymer, water and acrylonitrile is heated at the autogeneous pressure or above and the resulting melt is shaped into a desired form. The shaping processability is improved thereby.

7 Claims, No Drawings

PROCESS FOR THE MELT-SHAPING OF ACRYLONITRILE POLYMERS

The present invention relates to a process for the melt-shaping of acrylonitrile polymers. More particularly, the invention is concerned with a process for the melt-shaping of acrylonitrile polymers remarkably improved in shaping processability, wherein an acrylonitrile polymer, water and acrylonitrile is heated under a prescribed pressure to melt it, and the melt is shaped into a desired form.

In general, the melting point of acrylonitrile polymers is accepted as being about 320° C. But when acrylonitrile polymers are heated, thermal decomposition actually proceeds before the polymers are melted, and therefore it has been regarded as being substantially difficult to produce shaped articles such as fibers, films, etc. by employing melt-shaping means.

Therefore, to prevent the occurrence of such thermal decomposition and to melt-shape an acrylonitrile polymer while maintaining fluidity necessary for the shaping processability, several processes have been proposed. For example, there are known a method of melt-shaping an acrylonitrile polymer having good thermal stability prepared by using an organic metallic catalyst, and like methods. However, these melt-shaping methods are considerably limited in that they require employment of a particular polymerization process, or the like. Thus, any of these methods has made the practice on an industrial scale practically impossible.

Another method is proposed in Japanese Patent Application Publication (unexamined) No. 49839/1973, wherein an acrylonitrile polymer is melt-shaped using water as the plasticizing substance. This method, however, is not satisfactory is advantageously lowering the melting point of the acrylonitrile polymer and thus makes the melt-shaping extremely difficult. Moreover, the melt is not sufficient in thermal stability and the finally obtained shaped article is colored, which is a fatal defect.

In view of such a situation, we made an intensive study to remove these defects accompanying such conventional techniques. As a result, it has been found that, by mixing an acrylonitrile polymer with a prescribed amount of acrylonitrile together with water which is a plasticizing substance, its plasticizing effect is synergetically intensified, whereby the melt-shaping processability of the acrylonitrile polymer is markedly improved without impairment of the physical properties of the final article. This finding led to the present invention.

A principal object of the present invention is to provide a melt-shaping technique of an acrylonitrile polymer which is excellent in shaping processability.

another principal object of the invention is to provide an industrial melt-shaping process which enables to obtain a shaped product, of which the coloring is considerably restrained and which has a high commercial value, from a melt of an acrylonitrile polymer having excellent fluidity.

Other objects of the present invention will become apparent from the following concrete description.

The above-mentioned objects of the present invention are achieved effectively by heating an acrylonitrile polymer composition, obtained by uniformly mixing 30 - 90 weight percent of an acrylonitrile polymer, 1 - 56 weight percent of water and 2 - 63 weight percent of acrylonitrile, to melt it under the autogenous pressure or above, and shaping the melt into a desired form.

According to the present invention, by mixing an acrylonitrile polymer with a prescribed amount of acrylonitrile together with water which is a plasticizing substance, it is possible to lower the reological characteristics of the melt, such as the melting point and melt viscosity, by the so-called "ball bearing effect" (which causes the plasticizing substances to diffuse and come among the acrylonitrile polymer molecules whereby the interaction between them is restrained and the slipping flow is facilitated), although the water added is in a reduced amount as compared with conventional processes. Thus, not only the shaping processability is markedly improved but also the thermal stability is greatly improved, whereby it is possible to obtain shaped articles of high commercial value, greatly improved in coloring, i.e. having a high degree of whiteness.

The term acrylonitrile polymers as referred to in the present invention is a generic term for acrylonitrile homopolymers and acrylonitrile copolymers, containing at least 40 weight percent acrylonitrile, resulting from the copolymerization of acrylontrile with a vinyl compound (for example esters of acrylic acid and methacrylic acid; acrylamide and its derivatives; vinyl halides, vinylidene halides; vinyl esters such as vinyl acetate; vinylpyridine), and mixtures of these polymers. Also, these acrylonitrile polymers further containing, as ionizable groups, hydrophilic groups such as sulfonic acid groups, carboxyl groups, phosphoric acid groups and their salt groups, may be used.

To prepare an acrylonitrile polymer composition of the present invention, it is necessary to mix uniformly 30 - 90 weight percent, preferably 50 - 85 weight percent, of one of the above-mentioned acrylonitrile polymers, 1 - 56 weight percent, preferably 2 - 32 weight percent, of water and 2 - 63 weight percent, preferably 4 - 36 weight percent, of acrylonitrile. When the mixing ratio of the acrylonitrile polymer is less than 30 weight percent, there is not formed a uniform phase among the acrylonitrile polymer, water and acrylonitrile, and formed even upon melting the mixture it is difficult to prepare a uniform melt. On the other hand, a mixing ratio in excess of 90 percent of the acrylonitrile polymer is not desirable since such a mixing ratio fails in effectively lowering the melting point of the polymer and deteriorates the physical properties of the final shaped article. Also, when the mixing ratios of acrylonitrile and water, the plasticizing substances, depart from the above-mentioned ranges, it becomes difficult to improve the fluidity of the melt consisting of the acrylonitrile polymer composition, as in the case where the mixing ratio of the acrylonitrile polymer exceeds 90%.

In the preparation of the acrylonitrile polymer composition, there is no particular limitation on the mixing method of the acrylonitrile polymer, water and acrylonitrile, and the method may be freely selected from known mixing means. However, to obtain uniformity of mixing, it is desirable to adopt a method wherein acrylonitrile is dissolved or dispersed in water beforehand to prepare a mixture and then the acrylonitrile polymer is mixed with the mixture.

The acrylonitrile polymer composition thus obtained is thereafter fed to a suitable melt-shaping apparatus to produce a desired shaped article, and it is melted by heating under the autogenous pressure or above. At this time, the heating temperature for the acrylonitrile polymer composition is maintained more than 100° C., preferably within the range of 110° to 220° C. When the heating temperature is less than 100° C., the fluidity of the acrylonitrile polymer composition is insufficient, with the result that continuous shaping processing becomes difficult. On the other hand, when too high a temperature is adopted, the acrylonitrile polymer composition is extremely colored and this impairs the commercial value of the final shaped article. Upon melting the acrylonitrile polymer composition, it is necessary to carry out the melting under the autogenous pressure or above, as previously mentioned, but preferably under a pressure between 3 and 50 kg/cm². By adopting such a pressure condition, the fluidity of the acrylonitrile polymer composition can be further improved.

The polymer composition thus melted is then shaped into a desired form. The term desired form as referred to in the present invention is a generic term for three-dimensional blocks, i.e. plastics, two-dimensional films and one-dimensional filaments. As the techniques for shaping into a desired form, any conventional technique may be directly employed. For example, as the shaping techniques for plastics, compression molding; as the techniques for film shaping, calender method, T-die method, inflation method; and as the techniques for filament formation, semi-melt-spinning, melt-spinning, may be freely selected for use. In the production of acrylic fibers by extruding the melt through spinning orifices, it is preferable to use wet-hot or dry-hot atmosphere (under normal or increased pressure) as the spinning atmosphere. Most particularly, it is preferable that the melt is extruded through spinning orifices into unsaturated or saturated steam or superheated steam atmosphere at a temperature of about 50° to about 200° C., more preferably about 80 to about 140° C. in order to improve spinnability. After the extrusion the fibers can be subjected to usual treatments such as drying, relax heat treatment, mechanical crimping, etc.

The shaped articles such as plastics, films, filaments, etc. obtained by the process of the present invention retain the general physical properties and are substantially free from coloring. Therefore, in the uniqueness of its action and effect, the process of the present invention should be highly valued as standing very far above the level of the conventional techniques.

Examples of practice will be given hereinafter to explain the process of the present invention more concretely, but the scope of the invention is by no means limited by the description of the examples. All parts and percentages in the examples are by weight unless otherwise specified.

EXAMPLE 1

An acrylonitrile copolymer consisting of 90% acrylonitrile and 10% methyl acrylate, water and acrylonitrile were mixed in the mixing ratios shown in Table 1 to prepare acrylonitrile polymer composition. Each composition was put into a pressure resisting cell through which the interior can be observed, and then the cell was hermetically sealed. Thereafter, the cell was heated from the outside and the melting behavior of the acrylonitrile polymer composition was observed. After the melt was cooled, it was removed from the cell to judge the coloring of the shaped article (the thermal stability of the melt). The melting points of the acrylonitrile polymer compositions and the coloring of the shaped articles, obtained by the observation are set forth in Table 1.

As comparative examples, there were prepared two kinds of acrylonitrile polymer compositions, one obtained from 60 parts of the above-mentioned acrylonitrile copolymer and 40 parts of water, and the other obtained from 80 parts of said acrylonitrile copolymer and 20 parts of water; and two kinds of acrylonitrile polymer compositions, one obtained from 60 parts of the above-mentioned acrylonitrile copolymer and 40 parts of acrylonitrile, and the other obtained from 80 parts of said acrylonitrile copolymer and 20 parts of acrylonitrile, and their melting behavior was observed using the above-mentioned cell. The melting points of the acrylonitrile polymer compositions and the coloring of the shaped articles, obtained by the observation are also given together in Table 1.

Table 1

|  | Acrylonitrile polymer compositions | | | Melting points of the acrylonitrile polymer compositions (° C.) | Coloring of the shaped articles O: not colored X: colored |
| --- | --- | --- | --- | --- | --- |
|  | Acrylonitrile polymer (%) | Water (%) | Acrylonitrile composition (%) | | |
| Present invention | 60 | 32 | 8 | 137 | 0 |
|  | 60 | 24 | 16 | 125 | 0 |
|  | 60 | 16 | 24 | 116 | 0 |
|  | 60 | 8 | 32 | 113 | 0 |
|  | 60 | 4 | 36 | 127 | 0 |
|  | 80 | 16 | 4 | 148 | 0 |
|  | 80 | 12 | 8 | 143 | 0 |
|  | 80 | 8 | 12 | 143 | 0 |
|  | 80 | 4 | 16 | 141 | 0 |
|  | 80 | 2 | 18 | 143 | 0 |
| Comparative Examples | 60 | 40 | — | 152 | X |
|  | 80 | 20 | — | 153 | X |
|  | 60 | — | 40 | >180 | X |
|  | 80 | — | 20 | >180 | X |

From the results in Table 1, it is easily understood that, in the case of the acrylonitrile polymer compositions containing in mixture therewith water and acrylonitrile, their melting points were markedly lowered as compared with those containing only water or acrylonitrile, and moreover no coloring occurred to the shaped articles obtained.

In addition, the acrylonitrile polymer composition, shown in Table 1, obtained by uniformly mixing 60 parts 60 the acrylonitrile copolymer, 8 parts of water and 32 parts of acrylonitrile, was fed to a Plunger-type flow tester melt-spinning apparatus (type 301; produced by Shimadzu Seisakusho Ltd.), and heated under the autogenous pressure to melt. The melt maintained at 140° C. was melt-spun through spinning orifices, each 0.5 mm in diameter, with the draft ratio maintained at 2 times under an extrusion pressure of 45 kg/cm². By virtue of the compounding of the prescribed amount of acrylonitrile, no substantial filament breaking occurred at the time of extrusion, which allowed continuation of stable spinning. The physical properties of the finally obtained acrylic synthetic fiber were by no means inferior to those of ordinary acrylic synthetic fibers. In addition, the fiber represented excellent whiteness.

EXAMPLE 2

Acrylonitrile polymer compositions were prepared by mixing an acrylonitrile copolymer consisting of 81% acrylonitrile and 19% methyl acrylate, water and acrylonitrile in such mixing ratios as shown in Table 2, and in the same operation as in Example 1, the melting behavior of the acrylonirile polymer compositions was observed. The melting points of the acrylonitrile polymer compositions and the coloring of the shaped articles (the thermal stability of the melts), obtained by the observation are set forth in Table 2.

In addition, as comparative examples, there were prepared two kinds of acrylonitrile polymer compositions, one obtained from 60 parts of the above-mentioned acrylonitrile copolymer and 40 parts of water, and the other obtained from 60 parts of said acrylonitrile copolymer and 40 parts of acrylonitrile. These polymer compositions were observed for the melting behavior in the same operation as in Example 1. The results obtained from the observations are given together in Table 2.

Table 2

|  | Acrylonitrile polymer compositions | | | Melting points of the acrylonitrile polymer compositions (° C.) | Coloring of the shaped artiles O:not colored X: colored |
|---|---|---|---|---|---|
|  | Acrylonitrile polymer (%) | Water (%) | Acrylonitrile (%) | | |
| Present invention | 60 | 32 | 8 | 114 | 0 |
| | 60 | 24 | 16 | 102 | 0 |
| | 60 | 16 | 24 | 96 | 0 |
| | 60 | 8 | 32 | 104 | 0 |
| | 60 | 4 | 36 | 109 | 0 |
| Comparative Examples | 60 | 40 | — | 133 | X |
| | 60 | — | 40 | >180 | X |

From the results in Table 2, it is clearly understood that in the case of the acrylonitrile polymer compositions recommended in the present invention, their melting points were markedly lowered as compared with that of the acrylonitrile copolymer and water, or that of the acrylonitrile copolymer and acrylonitrile, and moreover no foloring occurred to the shaped articles obtained.

In addition, the acrylonitrile polymer composition, shown in Table 2, obtained by uniformly mixing 60 parts of the acrylonitrile copolymer, 16 parts of water and 24 parts of acrylonitrile, was melt-spun under the same conditions as in Example 1. By virtue of the compounding of the prescribed amount of acrylonitrile, no filament breaking occurred upon extrusion, which allowed continuation of stable spinning. The physical properties and whiteness of the finally obtained acrylic synthetic fiber were excellent.

Further, the acrylonitrile polymer composition employed in the above-mentioned melt-spinning was fed to a known inflation shaping apparatus and extruded at 140° C. to form a film having a thickness of about 200 $\mu$. The finally obtained film represented no coloring, which markedly heightened its commercial value.

What we claim is:

1. A process for the melt-shaping of acrylonitrile polymers, characterized in that an acrylonitrile polymer composition consisting essentially of acrylonitrile polymer, water and acrylonitrile which is obtained by uniformly mixing 30 – 90 weight percent of an acrylonitrile polymer, 1 – 56 weight percent of water and 2 – 63 weight percent of acrylonitrile is heated at the autogeneous pressure or above, and the melt is shaped into a desired form.

2. A process as claimed in claim 1 wherein the acrylonitrile polymer composition is obtained by mixing 50 – 85 weight percent of an acrylonitrile polymer, 2 – 32 weight percent of water and 4 – 36 weight percent of acrylonitrile.

3. A process as claimed in claim 1 wherein acrylonitrile is first dissolved or dispersed in water to obtain an aqueous material, which is then mixed with an acrylonitrile polymer, in preparing said acrylonitrile polymer composition.

4. A process as claimed in claim 1 wherein the heating is conducted at a temperature of 100° C. or higher.

5. A process as claimed in claim 4 wherein the heating is conducted at a temperature of 110° – 220° C.

6. A process as claimed in claim 1 wherein the heating is conducted at a pressure of 3 – 50 kg/cm$^2$.

7. A process as claimed in claim 1 wherein filaments are shaped from the melt.

* * * * *